United States Patent [19]

Fickett

[11] 3,792,829
[45] Feb. 19, 1974

[54] FISHING ROD HOLDER

[76] Inventor: Lee R. Fickett, Webster Rd., Lewiston, Maine 04240

[22] Filed: Oct. 26, 1971

[21] Appl. No.: 192,189

[52] U.S. Cl............ 248/42, 43/21.2, 248/229, 248/305, 248/316 R
[51] Int. Cl............................................ A01k 97/10
[58] Field of Search......... 248/42, 305, 316 R, 229; 43/21.2; 294/84, 83 R

[56] References Cited
UNITED STATES PATENTS

| | | | |
|---|---|---|---|
| 2,722,449 | 11/1955 | Harley | 294/83 R |
| 2,682,127 | 6/1954 | Binder | 248/42 X |
| 2,680,924 | 6/1954 | Menegay | 43/21.2 |
| 2,220,234 | 11/1940 | Hadaway | 248/42 |
| 2,722,727 | 11/1955 | Scheifele | 248/42 UX |
| 2,961,209 | 11/1960 | Willey | 43/21.2 UX |
| 2,621,877 | 12/1952 | Grigsby | 43/21.2 X |
| 3,167,346 | 1/1965 | Miller | 294/84 |

*Primary Examiner*—William H. Schultz
*Assistant Examiner*—Rodney H. Bonck
*Attorney, Agent, or Firm*—Abbott Spear

[57] ABSTRACT

Fishing rod holders are disclosed with each having a retainer hingedly connected to one side of its receiver and provided with an arm exposed to be engaged and depressed by the rod as it is being seated therein thus to swing the retainer from the open position into its closed position. A latch is pivotally connected to the receiver and it and the retainer include shoulders engageable to prevent movement of the retainer in a rod-releasing direction. The latch is spring biased into its retainer locking position and becomes operative whenever the retainer is closed.

6 Claims, 6 Drawing Figures

PATENTED FEB 19 1974 3,792,829

Inventor:
Lee R. Fickett,
by Abbott Spear,
Attorney

3,792,829

FISHING ROD HOLDER

BACKGROUND OF THE INVENTION

As the holding of a fishing rod in trolling or when bait fishing from the shore, a wharf, or an anchored boat often becomes tiresome, it has long been the practice to use some means to support a rod in a position where it can be picked up in the event of a bite or strike. As a consequence of this common practice, rod holders have been proposed to better meet fishermen's requirements than the makeshift arrangements usually used. One such proposal is shown in U. S. Letters Pat. No. 2,184,583, the disclosed rod holder being attachable to a support and adjustable and provided with a thumb-releasable rod retainer.

Such previously proposed rod holders, including that of said patent, have not, as far as I can determine, been accepted and, while that of said patent contemplates desired functions, it fails to provide automatic locking of the rod to the receiver when placed therein and a satisfactory latching arrangement.

THE PRESENT INVENTION

The present invention has for one objective the provision of fishing rod holders that have means automatically locking a rod thereto, an objective attained with a holder including a receiver for a butt portion of a rod and a retainer connected thereto for movement between a rod-retaining position and an open position in which the rod may be removed from or replaced in the receiver, the retainer including means so exposed in its open position that it is engaged by the butt portion of the rod as it is being seated in the receiver, then to be actuated to return the retainer to its operative position. The holder is provided with releasable means operable to lock the retainer in its operative position.

Another objective of the present invention is to provide a fishing rod holder in which the latch means between the retainer and the receiver becomes operative upon the movement of the retainer into its operative position, an objective attained by pivotally attaching a latch to the receiver at one side thereof and by providing the retainer and the latch with interlocking portions arranged and disposed so that a force applied to the retainer in the rod-releasing direction is transmitted through the interlocked portions and against and opposed by the latch pivot while permitting the latch to be pivoted to disengage the portions then to release the retainer and, desirably, the latch is spring-biased into its retainer-locking position.

The objectives of the invention are best attained when the rod holders include both of the above generally defined features, each with its retainer pivotally connected to the receiver and including an arm disposed within the receiver to move, when the retainer swings into its open position, into a position in which it is engaged and forced downwardly to return the retainer into its operative position as a rod butt is placed in the receiver. The retainer also includes, on its side that is hingedly connected to the receiver, a shoulder as the appropriate one of the interlocking portions, the other of which is in the form of a latch shoulder.

While the invention is herein discussed with particular reference to holders for fishing rods, holders in accordance with the invention are adapted for other uses, generally where a member must be securely held in a manner permitting it to be quickly and easily released.

Preferred embodiments of the invention are shown in the accompanying drawings in which FIG. 1 is a side view of the holder in support of a rod;

Figure 1:
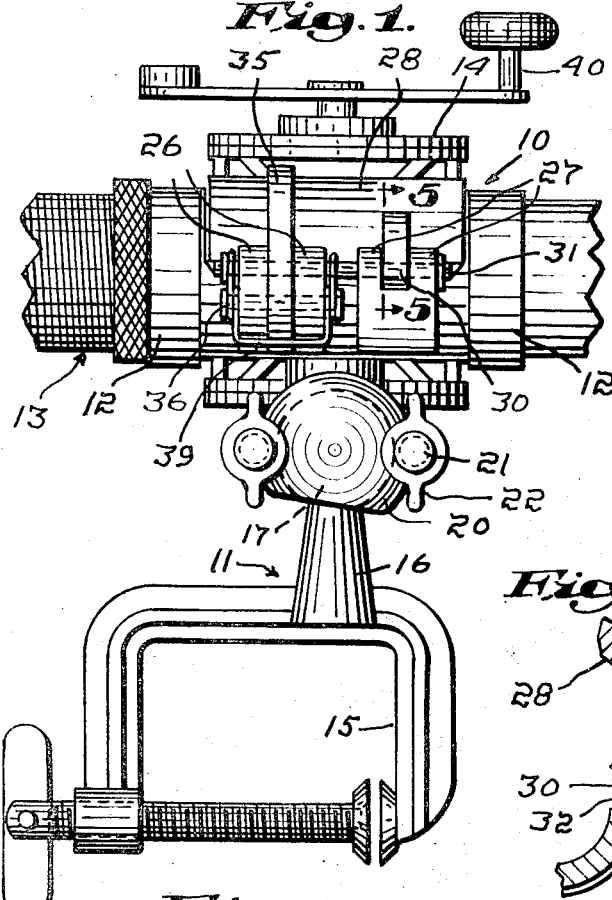
Figure 3:
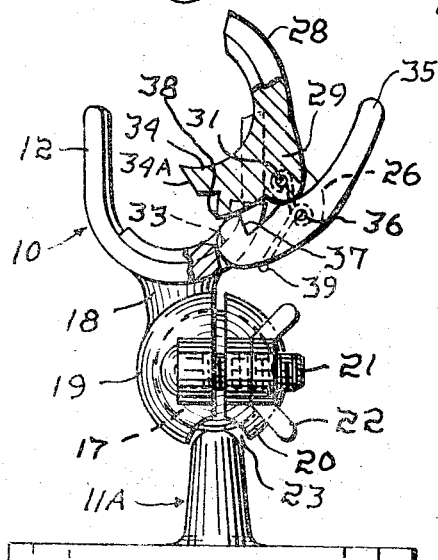
FIG. 3 is a like view but showing a different type of support and with the retainer in its open position.
Figure 4:
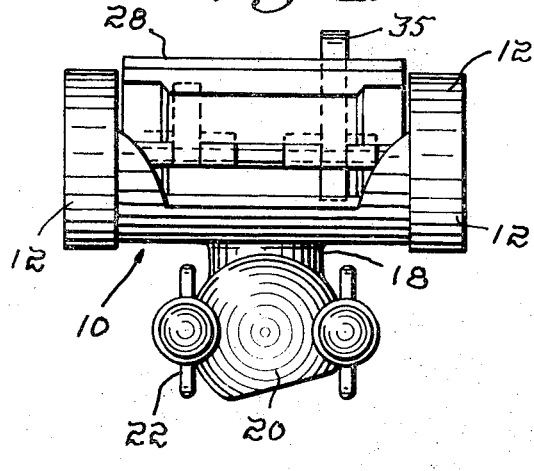
FIG. 4 is a fragmentary view showing the opposite side of the holder.

A rod holder in accordance with the invention comprises a receiver, generally indicated at 10 and a support therefor generally indicated at 11 in FIGS. 1 and at 11A in FIG. 3.

The receiver 10 includes a pair of U-shaped ends 12 dimensioned to receive the reel seat portion 13 of a fishing rod and spaced apart to accommodate between them a reel 14 secured thereto.

Figure 2:
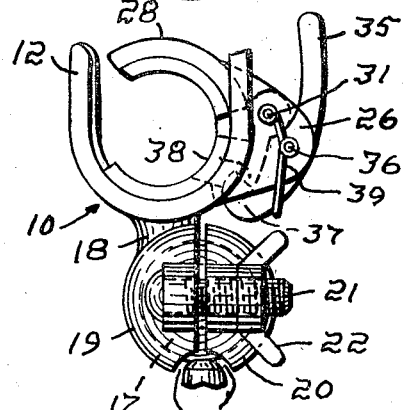
FIG. 2 is an end view of the holder with the retainer in its operative position but with the rod removed.

The support 11 is shown as including a C-clamp 15 by which the holder may be detachably secured to the side of a boat. The clamp 15 is or may be conventional except that it is provided with a tapered post 16 terminating in a ball 17. The receiver 10 has a depending post 18 provided with a laterally opening socket portion 19 fitting one side of the ball 17 and a clamping socket portion 20 fitting the opposite side thereof and shown as attached to the socket portion 19 by a pair of fixed bolts 21 each having a wing nut 22 threaded thereon to enable the receiver 10 to be easily and securely clamped in a selected position. While it is obvious that the receiver 10 may be turned in a horizontal plane through 360°, it is to be noted that the lower, proximate margins of the socket portions 19 and 20 are relieved as at 23, see FIG. 2, to enable the receiver 10 to be tilted to a desired extent.

The support 11A includes a mount 24 in the form of a plate having holes 25 for screws and is provided where the support is to be permanently attached. As the support 11A is otherwise similar to the support 11, it is not further described.

The receiver 10 has, at one side, two pairs of longitudinally spaced ears 26 and 27, see FIG. 1. A retainer 28, arcuate in cross section, has arms 29 and 30 spaced lengthwise thereof for entry between the pairs of ears 26 and 27, respectively, and hingedly connected thereto by a pivot 31 enabling the retainer 28 to be swung between its FIG. 1 and FIG. 2 operative position in which it overlies the receiver 10 into its open position shown in FIG. 3.

Figure 5:
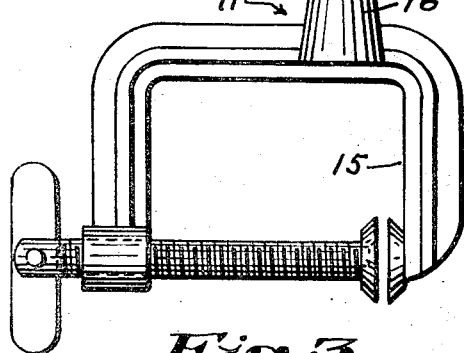
FIG. 5 is a section taken approximately along the indicated lines 5—5 of FIG. 1 but with the retainer in its open position.

It will be noted, see FIG. 5, that there is a stop seat 32 between the ears 27 on which the arm 30 rests in its operative position and that the outer extremity of the arm 30 engages therewith in the open position of the retainer 28 thus to provide a positive limit to the extent to which the retainer 28 may be opened.

It will be noted, see FIG. 3, that the receiver 10 has a transverse slot 33 extending substantially to the center thereof between the ears 26 and that the arm 29 has an arcuate extension 34 entrant of the slot 33 in the closed position of the retainer 28 but exposed for engagement by the rod butt 13 when it is seated therein thereby to swing the retainer 28 into its closed position. The extremity 34A of the arm extension 34 engages the bottom of the slot 33 in the closed or operative position of the retainer 28.

Figure 6:
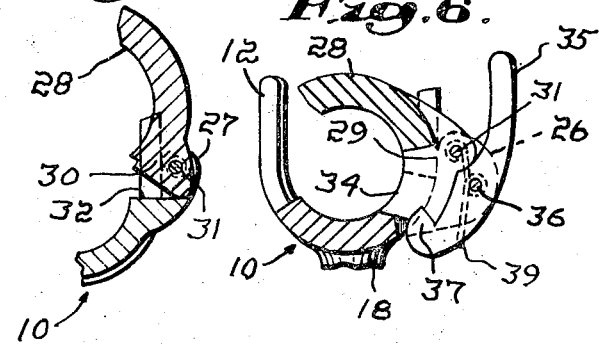
FIG. 6 is a view similar to FIG. 3 but with the latch securing its retainer in its closed position.

A latch 35 is held between the ears 26 by a pivot 36 which is located outwardly of and below the pivot 31. The latch 35 has a latching shoulder 37 in engagement with the complementally shaped latching shoulder 38 on the arm 29. It will be noted, see FIG. 6, that the latching shoulder 37 is substantially at right angles to a radius from the pivot 31 and that while the latch 35 may be pivoted to disengage its shoulder 37 from the shoulder 38, the retainer 28 cannot be pivoted to disengage the shoulder and that any upward pull on the retainer results in the force being applied against and directly opposed by the pivot 36. A U-spring 39, caught by the pivot 36 has its closed end underlying the shouldered end of the latch 35 and its upper ends held by the pivot 31 thereby yieldably urging the latch 35 into its operative position.

In use, with the holder suitably secured to the side of a boat, for example, and the retainer 28 in its open position, the seating of the reel seat portion of the rod in the receiver 10, desirably with the reel 16 positioned with its crank handle 40 upwardly disposed, results in the arm extension 34 being engaged and forced downwardly to swing the retainer into its closed, operative position and in so swinging, the latching shoulder 38 engages the end of the latch 37 and cams it outwardly until, under the influence of the spring 39, it is free to swing inwardly with the latching shoulders 37 and 38 engaged. When the retainer 28 is in its open position, the spring 39 seats the shouldered end of the latch 35 against the closed end of the slot 33.

When the rod is to be removed from the holder, as when there is a strike, the butt is grasped with one hand but with one finger momentarily engaging and moving the latch 35 towards the receiver 10 to release the retainer 28 as the rod is lifted from the holder thus placing the fisherman in a position to play the fish in the shortest possible time. When the rod is returned to the holder, the retainer is automatically returned to and locked in its operative position with the reel exposed so the use of only one hand is necessary in paying out or reeling in the line.

I claim:

1. A holder comprising a receiver dimensioned to receive and support a member, a retainer, a pivotal connection between the retainer and one side of the receiver to enable the retainer to swing between an operative, member-retaining position relative to the receiver and an inoperative, open position in which the member may be lifted therefrom, a latch, a pivotal connection between said latch and said one side of the receiver to enable the latch to swing between first and second positions, the axes of said pivotal connections being vertically spaced, said latch and said retainer including interlocking portions at said one side in engagement when the latch is in its first position and the retainer is in its operative position then to prevent movement of the retainer unless and until said portions are disengaged by movement of the latch into its second position, said latch including an operating portion at said one side and in a position close to the member-receiving opening of the receiver to be moved towards the receiver to effect the second latch position, and said retainer including means exposed within the receiver in the inoperative position of the retainer for engagement by said member as it is being placed in said receiver and movable thereby to return said retainer into its operative position.

2. The holder of claim 1 in which the receiver and the retainer include portions interengageable to provide a stop fixing the open position of the retainer.

3. The holder of claim 2 in which the retainer also has a portion engageable with the receiver portion fixing the closed position of the retainer.

4. The holder of claim 1 in which each pivotal connection includes a pivot and a coil spring is supported by the pivot of the latch connection with one end backed by the pivot of the retainer connection and its other end bearing on the latch.

5. The holder of claim 1 in which the receiver includes a bottom portion of substantial length and U-shaped end portions, the retainer is of substantial length and fits between said end portions, the bottom portion between said U-shaped portions has a transverse slot, and the retainer means is an arm fitting within said slot when the retainer is in its operative position.

6. The holder of claim 1 in which the holder includes a pair of projections spaced apart lengthwise of the receiver and common to both connections and the interlocking portions of the latch and the retainer are between said projections.

* * * * *